United States Patent
Binnig et al.

(10) Patent No.: US 7,849,516 B2
(45) Date of Patent: *Dec. 7, 2010

(54) PROBE FOR SCANNING OVER A SUBSTRATE AND A DATA STORAGE DEVICE

(75) Inventors: Gerd Binnig, Wollerau (CH); Evangelos Elefheriou, Rueschlikon (CH); Mark Lantz, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 157 days.

This patent is subject to a terminal disclaimer.

(21) Appl. No.: 12/187,759

(22) Filed: Aug. 7, 2008

(65) Prior Publication Data

US 2009/0003189 A1 Jan. 1, 2009

Related U.S. Application Data

(63) Continuation of application No. 11/331,933, filed on Jan. 13, 2006, now Pat. No. 7,437,915.

(30) Foreign Application Priority Data

Jan. 13, 2005 (EP) .................................. 05405019

(51) Int. Cl.
*G01Q 80/00* (2010.01)
(52) U.S. Cl. ............... 850/62; 850/1; 850/2; 850/3; 850/63; 73/866.5; 365/220; 365/221; 365/222; 369/13.01; 369/15; 369/127
(58) Field of Classification Search ............... 850/1, 850/2, 3, 13, 62, 63, 4, 5, 6; 257/213, 215, 257/225, 226; 430/269, 322, 330; 73/104, 73/105, 866.5; 365/189.011, 189.14, 189.15, 365/189.16, 220, 221, 222; 369/13.01, 15, 369/126, 127
See application file for complete search history.

(56) References Cited

U.S. PATENT DOCUMENTS

| | | | |
|---|---|---|---|
| 5,745,318 | A | 4/1998 | Kubota et al. |
| 5,804,710 | A | 9/1998 | Mamin et al. |
| 6,018,991 | A | 2/2000 | Nakano |
| 6,044,646 | A | 4/2000 | Silverbrook |
| 6,218,086 | B1 * | 4/2001 | Binnig et al. ............... 430/330 |

(Continued)

OTHER PUBLICATIONS

V. Vettiger et al.; "The Millipede—More than one thousand tips for future AFM data storage" IBM J. Res. Develop. vol. 44, No. 3, May 2000, pp. 323-340.

*Primary Examiner*—Jack I Berman
*Assistant Examiner*—Nicole Ippolito Rausch
(74) *Attorney, Agent, or Firm*—Cantor Colburn LLP

(57) ABSTRACT

A method of scanning over a substrate includes implementing a write mode of the substrate by scanning a probe across a substrate, the probe having a spring cantilever probe mechanically fixed to a probe holding structure, a tip with a nanoscale apex, and an actuator for lateral positioning of the tip; the actuator comprising a thermally switchable element and a heating element for heating the thermally switchable element; and heating the heating element to a given temperature so as to locally soften a portion of the substrate and applying a force to the softened portion of the substrate through the tip so as to create one or more indentation marks in the softened portion of the substrate.

14 Claims, 5 Drawing Sheets

U.S. PATENT DOCUMENTS

| | | | |
|---|---|---|---|
| 6,249,747 B1 * | 6/2001 | Binnig et al. ............... 702/33 |
| 6,327,855 B1 | 12/2001 | Hill et al. |
| 6,518,872 B1 * | 2/2003 | Edinger et al. ............ 338/25 |
| 6,867,443 B2 * | 3/2005 | Liu et al. ................. 257/226 |
| 6,923,044 B1 * | 8/2005 | Kley ........................ 73/105 |
| 6,995,368 B2 | 2/2006 | Wen et al. |
| 7,054,257 B2 | 5/2006 | Binnig et al. |
| 7,089,787 B2 | 8/2006 | Sahin et al. |
| 2001/0019461 A1 * | 9/2001 | Allenspach et al. ........ 360/59 |
| 2002/0110757 A1 * | 8/2002 | Fork et al. ................ 430/320 |
| 2003/0218960 A1 * | 11/2003 | Albrecht et al. .......... 369/126 |
| 2004/0211271 A1 * | 10/2004 | Han et al. ................ 73/866.5 |

* cited by examiner

PROBE FOR SCANNING OVER A SUBSTRATE AND A DATA STORAGE DEVICE

CROSS-REFERENCE TO RELATED APPLICATION

This application is a continuation of U.S. patent application Ser. No. 11/331,933, filed Jan. 13, 2006, now U.S. Pat. No. 7,437,915, the disclosure of which is incorporated by reference herein in its entirety.

BACKGROUND

The present invention relates to a probe for scanning over a substrate, a probe configuration, and a data storage device.

In the field of this invention techniques are known that use nanometer sharp tips for imaging and investigating the structure of materials down to the atomic scale. Such techniques include atomic force microscopy (AFM) and scanning tunneling microscopy (STM), as disclosed in EP 0 223 918 B1 and U.S. Pat. No. 4,343,993.

Based on the developments of the scanning tunneling microscopy and the atomic force microscopy, new storage concepts have been introduced over the past few years profiting from these technologies. Probes having a tip with a nanoscale apex are being introduced for modifying the topography and for scanning an appropriate storage medium. Data are written as sequences of bits represented by topographical marks, such as indentation marks and non-indentation marks. The tips comprise apexes with a radius in the lower nanometer range and the indentation marks have for example a diameter in the range of 20 to 40 nm, or even less. Hence, these data storage concepts promise ultra-high storage area density.

A data storage device based on the AFM principle is disclosed in "The millipede—more than 1,000 tips for future AFM data storage" by P. Vettiger et al., IBM Journal Research Development, Vol. 44, No. 3, March 2000. The storage device has a read and write function based on a mechanical x-, y-scanning of a storage medium with an array of probes each having a tip. The probes operate in parallel, each probe scanning during operation an associated field of the storage medium. That way high data rates may be achieved. The storage medium comprises a thin polymer layer such as polymethylmethacrylate (PMMA). In one mode of operation, the tips are moved across the surface of the polymer layer in a contact mode. The contact mode is achieved by applying small forces to the probes so that the tips of the probes can touch the surface of the storage medium. For that purpose, the probes comprise cantilevers which carry the sharp tips on their end sections. Bits are represented by indentation marks or non-indentation marks in the polymer layer. The cantilevers respond to these topographic changes in the surface while they are moved across the surface. Indentation marks are formed on the polymer surface by thermomechanical recording. This is achieved by heating a respective probe with a current or voltage pulse during the contact mode in a way that the polymer layer is softened locally where the tip touches the polymer layer. In addition to the application of heat, a force is applied to the polymer via the tip, resulting in a small indentation in the layer having a nanoscale diameter.

Reading is also accomplished by a thermomechanical concept. The heater cantilever is supplied with an amount of electrical energy, which causes the probe to heat up to a temperature that is not high enough to soften the polymer layer as is necessary for writing. The thermal sensing is based on the fact that the thermal conductance between the probe and the storage medium, especially a substrate under the storage medium, changes when the probe is moving in an indentation as the heat transport is in this case more efficient. As a consequence of this, the temperature of the cantilever decreases and hence, also its electrical resistance changes. This change of electrical resistance is then measured and serves as the measuring signal.

In STM a sharp tip is scanned in close proximity to the surface and voltage applied between the tip and the surface gives rise to a tunnel current that depends on the tip-surface separation. From a data-storage point of view, such a technique may be used to image or sense topographic changes on a flat medium that represent stored information in logical "0s" and "1s". In order to achieve reasonable stable current, the tip-sample separation must be maintained extremely small and fairly constant. In STM, the surface to be scanned needs to be of an electrically conductive material.

Applicants EP 1 385 161 A2 discloses a storage device and a method for scanning a storage medium. The storage medium is designed for storing data in the form of marks and is scanned by an array of probes for mark detection purposes in a scanning mode. The storage medium has fields with each field to be scanned by an associated one of the probes. At least one of the fields comprises marks representing operational data for operating the scanning mode. Scanning parameters are computed from the operational data and the scanning mode is adjusted according to the scanning parameters. The marks representing operational data may represent information for adjusting a tracking position. For that purpose, special marks are formed in respective fields of the storage medium, which are located in different positions relative to a track center line. By scanning these marks, information of the actual position of the probes relative to the track center line can be derived and used for adjusting a tracking positioning. Other fields comprise marks located in a periodic manner along respective lines within tracks. By scanning these fields, timing or clocking information may be obtained, which is used for adjusting the frequency of reading, writing or erasing pulses applied to the probes. These clocking or tracking adjustments take effect for all of the fields and the respective allocated probes. U.S. Pat. No. 5,153,787 refers to a servo concept for magnetic disk drives.

It is a challenge to provide a probe for scanning over a substrate which is simple and enables a precise operation of the probe. It is furthermore a challenge to provide a data storage device with the probe which is simple and enables a precise operation.

SUMMARY

According to one aspect of the invention, a method of scanning over a substrate includes implementing a write mode of the substrate by scanning a probe across a substrate, the probe having a spring cantilever probe mechanically fixed to a probe holding structure, a tip with a nanoscale apex, and an actuator for lateral positioning of the tip; the actuator comprising a thermally switchable element and a heating element for heating the thermally switchable element; and heating the heating element to a given temperature so as to locally soften a portion of the substrate and applying a force to the softened portion of the substrate through the tip so as to create one or more indentation marks in the softened portion of the substrate.

BRIEF DESCRIPTION OF THE SEVERAL VIEWS OF THE DRAWINGS

The invention and its embodiments will be more fully appreciated by reference to the following detailed description of presently preferred but nonetheless illustrative embodiments in accordance with the present invention when taken in conjunction with the accompanying drawings.

The figures are illustrating.

DETAILED DESCRIPTION

Figure 1:
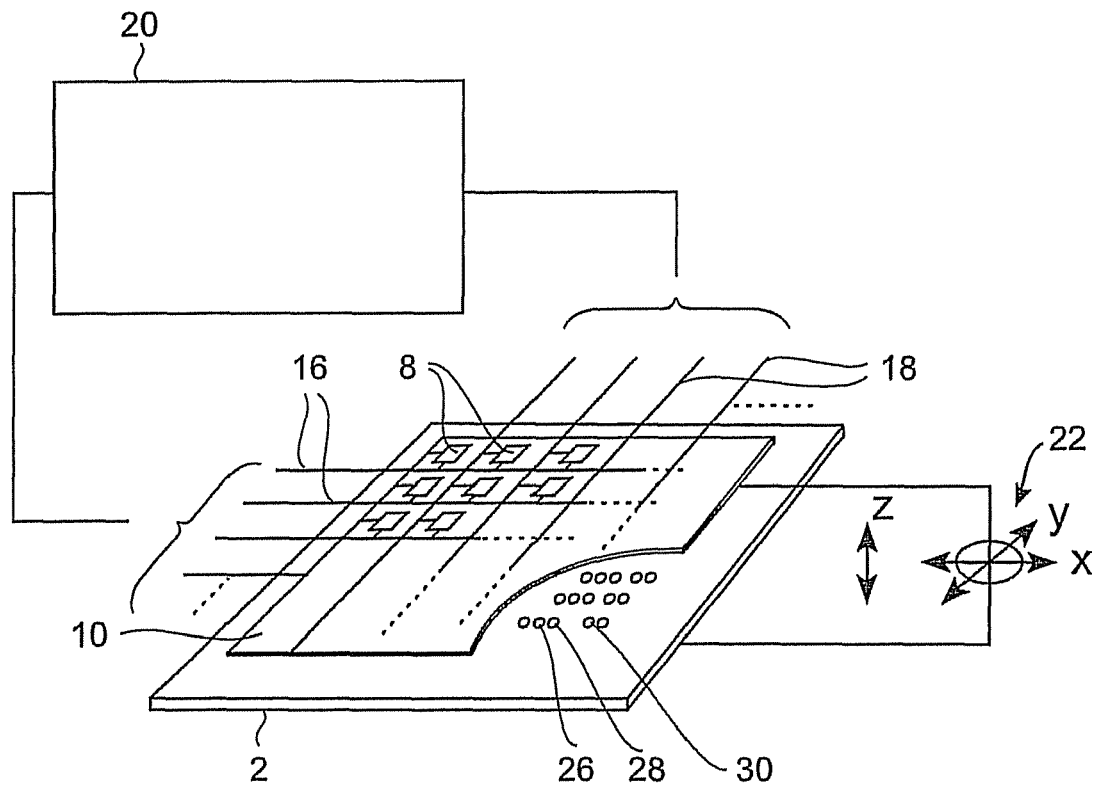
FIG. 1, a perspective view of a data storage device comprising probes.
Figure 2:
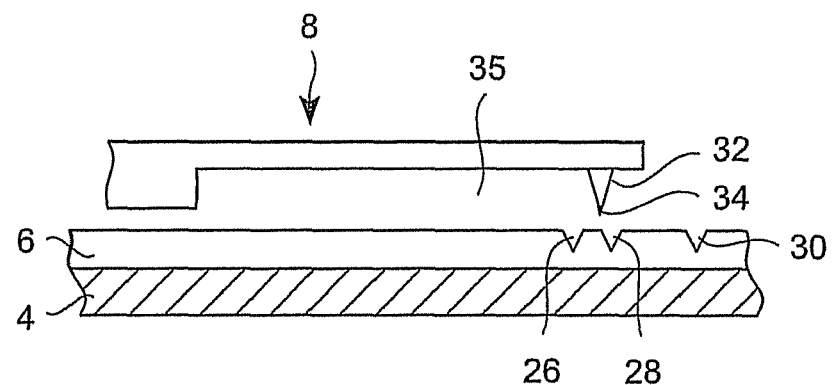
FIG. 2, a cross-sectional view of part of the data storage device according to FIG. 1, FIG. 3, a first embodiment of a probe in top view, FIG. 4, a second embodiment of a probe in top view, FIG. 5, a third embodiment of a probe in top view, FIG. 6, a first embodiment of a probe configuration in top view, and FIG. 7, a second embodiment of a probe configuration in top view.

FIG. 1 shows a perspective view of a data storage device that is used for storing data and FIG. 2 shows a cross-sectional view of part of the data storage device according to FIG. 1. The data storage device comprises a substrate 2, which may consist of a base substrate and a surface substrate 6. The base substrate 4 is preferably manufactured from silicon. The surface substrate 6 may be formed of a thin polymethylmethacrylate (PMMA) layer. The surface substrate 6 may, however, also consist of different materials like an electrically conductive material, patterned magnetic material, or other polymers. The surface substrate 6 may also be referred to as storage medium.

An array of probes 8 is mounted on a common frame 10. Only a few probes 8 are shown in FIG. 1. The data storage device may, however, comprise a large number of probes, such as 1024 or even a significantly larger number of probes 8. However, the data storage device may also comprise just one probe 8. In addition to that the probe 8 may also be used for purposes other than for storing data. In that way the probe 8 may also be used in the field of probe microscopy, for example.

Figure 3:
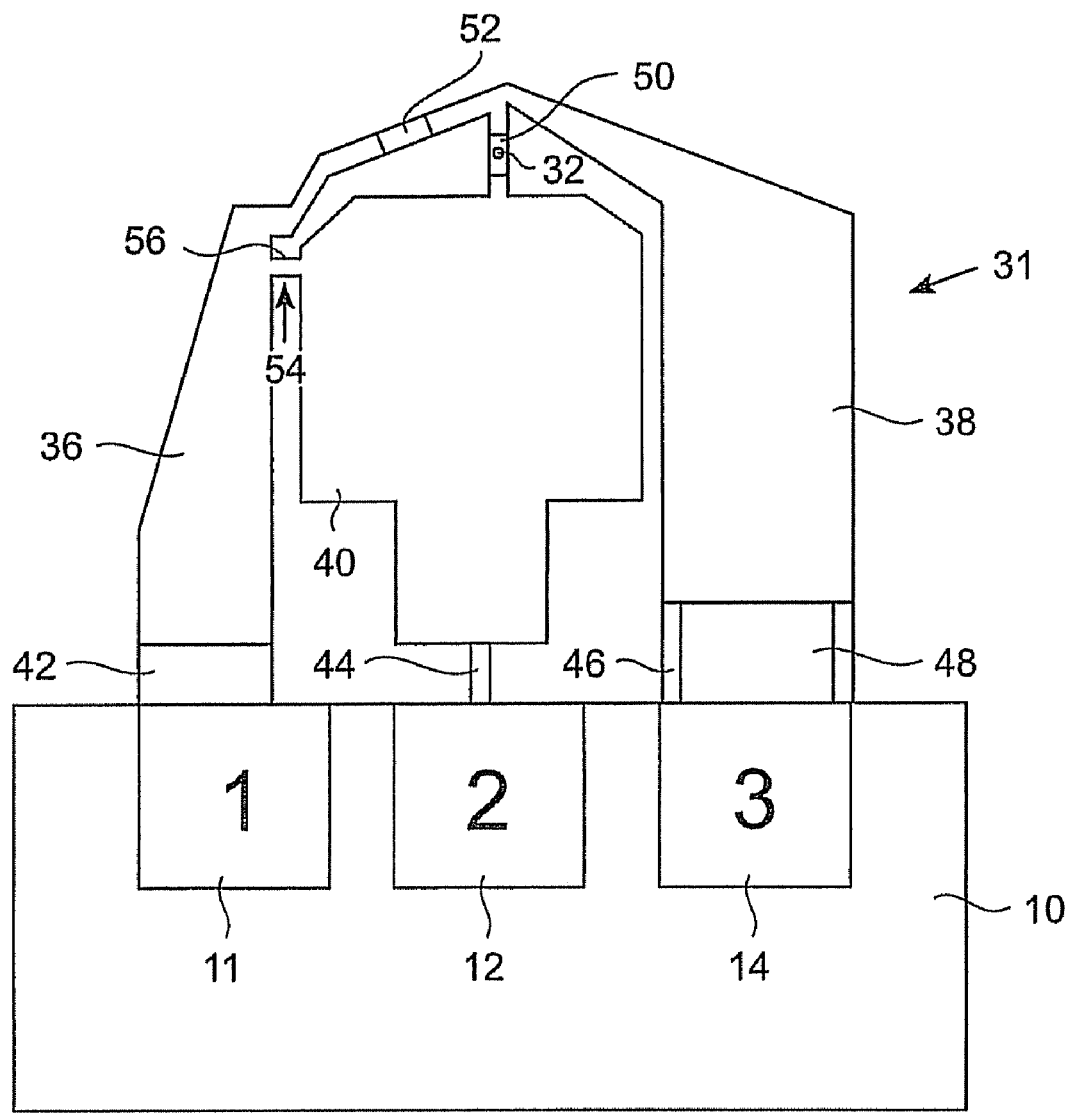

Each probe 8 comprises terminals, preferably first, second and third terminals 11, 12, 14 (FIG. 3), which are electrically connected to a control and information processing unit 20 via electrically conductive lines. The terminals 11, 12, 14 of each probe 8 may all be individually directly connected to the control and information processing unit 20. However, in order to reduce the complexity of the wiring, the terminals 11, 12, 14 may also be connected via row-lines 16 and column-lines 18 and possibly via non-shown multiplexers to the control and information processing unit 20.

The control and information processing unit 20 is designed for creating control parameters applied to the probes 8 via their terminals 11, 12, 14 or sensing parameters present on the terminals 11 to 14, such as a current or a voltage potential. The control and information processing unit 20 is further designed for controlling a movement of the substrate 2 relative to the frame 10 in an x- and y-direction and possibly in a z-direction. The actuation for this is accomplished by a scanner 22.

Hence, the substrate 2 and the frame 10 containing the probes 8 are moveable relative to each other. A relative movement in the z-direction may also or in addition be accomplished by applying respective electrostatic forces on the probes 8. The substrate 2 is preferably supported by springs in the x- and y-direction. Heaters for individually heating the springs may be provided.

In the surface substrate 6 marks 26 to 30 are present, which represent a logical information. Preferably, they form topographic marks and may represent as indentation marks logical "1"s whereas the absence of the indentation marks may represent logical "0"s. The marks 26 to 30 are of a nanoscale diameter. In FIG. 1 only a few marks 26 to 30 are shown, which also do not represent their real physical properties. The few marks 26 to 30 are just shown by way of example.

The probe 8 comprises a spring cantilever 31 with the terminals 11, 12, 14 being mechanically fixed to the frame 10. The probe comprises a tip 32 with a nanoscale apex 32, preferably having a radius in the low nanometer range, preferably in a range of 100 nm or less, in another preferred embodiment in a range of 50 nm or less, in a further preferred embodiment in a range of 10 nm or less, and according to another preferred embodiment in a range of 20 to 40 nm. The tip 32 is facing the surface substrate 6. The marks 26 to 30 are created by applying a combination of force and heat via the probe 8 to the base substrate 6. The marks 26 to 30 are detected by sensing whether the tip 32 has moved into one of the indentations 26 to 30, or not.

In the preferred thermomechanical concept for the probe 8 each probe 8 comprises a first heating resistor 50 (FIG. 3) for writing and a second heating resistor 52 for reading. During a write mode of the probe the probe is scanned across the substrate and whenever a mark 26 to 30 is to be created the first heating resistor 50 is heated up to a given temperature, which results in heat conduction towards the base substrate 6 via the tip 32. In that way the base substrate 6 is locally softened, which then leads, in combination with a force being applied to the base substrate via the tip 32, to the creation of one of the indentation marks 26 to 30.

In a read mode the second heating resistor 52 is either permanently or intermittently heated up to a further given temperature and a change in heat dissipation caused by a change in a distance between the heating resistor 52 and the base substrate 6 when the tip 32 moves into one of the marks 26 to 30 is sensed and in that way the respective mark 26 to 30 is detected.

The probe 8 further comprises hinges 42, 44, 46, 48 which abut to the first to third terminals 11, 12, 14. The hinges 42, 44, 46 are tapered relative to the cantilever structure in a direction parallel to an axis of the tip 32. They serve the purpose of setting a spring constant of the spring cantilever 31. The spring cantilever 31 further comprises legs 36, 38 and may comprise a capacitive platform 40. The first and second legs 36, 38 abut to the hinges 42, 46, 48 and the capacitive platform 40 abuts to the hinge 44. The legs 36, 38 and the capacitive platform 40 acting together with the hinges 42, 44, 46 and 48 electrically couple the first and second heating resistors 50, 52 with the respective terminals 11, 12, 14. In that way the capacitive platform 40 also serves as a leg.

The tip 32 is preferably located close to the first heating resistor 50 for writing. It is preferred in this respect, if the tip 32 is located on top of the first heating resistor 50. The cantilever 31 is preferably manufactured from silicon. The hinges 42, 44, 46, 48, the legs 36, 38 and the capacitive platform 40 may be highly n-doped in order to provide a low electrical resistance. The first and second heating resistors 50, 52 are obtained by doping respective areas of the cantilever with a lower n-doping concentration.

The terminals 11, 12, 14, may be provided with suitably chosen voltages. For the write mode, when a mark 26 to 30 is to be created, a given potential difference is provided on the second and third terminals 12, 14. This results in a voltage drop over the first heating resistor and in that way results in heating up the first heating resistor 50. An amount of electrical energy applied to the first heating resistor 50 during one write event is chosen properly in order to create enough heat in order to soften the surface substrate sufficiently. During the read mode the first and third terminals 11, 14 are supplied with a suitably chosen potential difference, which then results in a voltage drop over the second heating resistor 52. The second heating resistor 52 is located far enough away from the tip in order to only slightly conduct heat towards the tip 32. As heat dissipation from the second heating resistor 52 to the substrate 2 changes depending on the spacing between the second heating resistor 52 and the substrate 2 in the direction parallel to the axis of the tip 32 this spacing may be sensed by either the electrical power needed to keep the second heating resistor 52 on a given temperature or by sensing a temperature change resulting in a change of resistance of the second heating resistor 52.

The probe 8 is provided with an actuator for lateral positioning of the tip 32. In the first embodiment of the probe this actuator for lateral positioning is formed as a bridge 54 coupling the capacitive platform 40 with the first leg 36. The bridge 56 may also be fabricated from silicon and comprises a third heating resistor 56. By choosing the geometry of the bridge 54 and setting the resistance of the third resistor 56 suitably a thermal expansion characteristic of the bridge may be obtained in a desired way depending on a voltage drop over the third resistor 56. From the thermal expansion of the bridge 56 a lateral force results acting on the cantilever 31 which then results in lateral positioning of the tip 32. During operation of the probe 8 the lateral positioning of the probe 8 may be controlled by varying the voltage potentials provided on the first and second terminals 11, 12. In this design no additional terminal for the actuator for lateral positioning of the probe 8 is necessary.

A second embodiment of the probe (FIG. 4) also comprises the bridge 54 with the third heating resistor 56. In this embodiment, however, the bridge 54 is located close to the hinges 42, 44.

Figure 5:
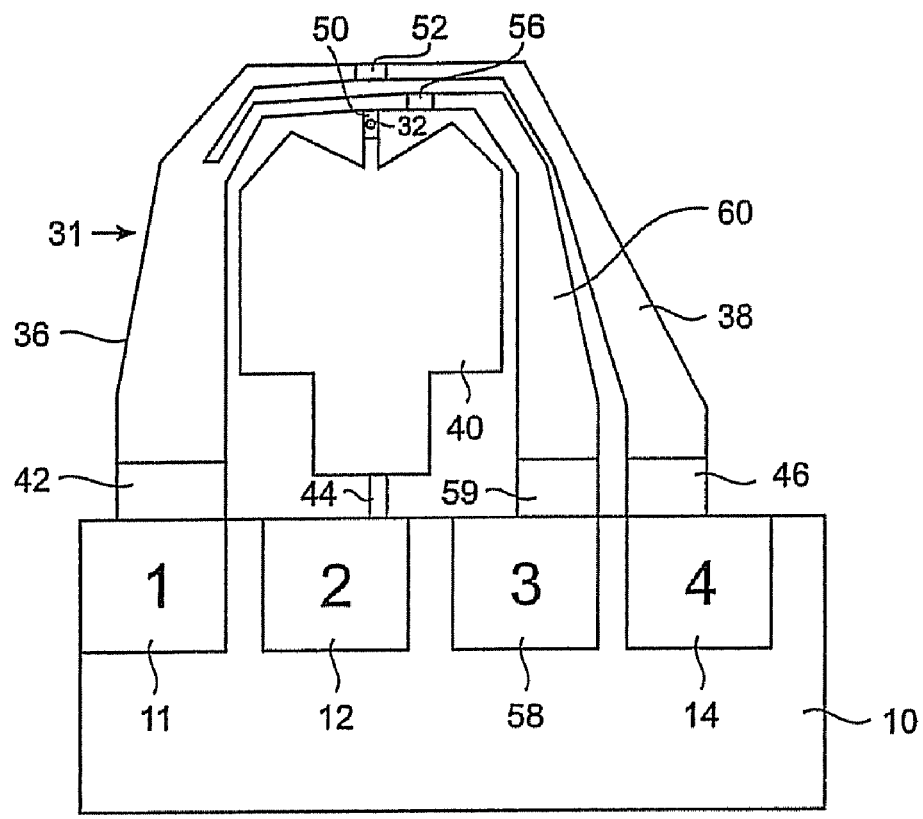

In a third embodiment of the probe 8 (FIG. 5) the third heating resistor 56 is electrically connected to a fourth terminal 58 via a third leg 60. The third heating resistor 56 is, on the other hand, electrically connected via the first leg 36 and the hinge 42 to the first terminal 11. A fourth hinge 59 is interposed between the fourth leg 60 and the fourth terminal 58. The third embodiment has the advantage, that an amount of electrical power that is supplied to the heating resistor 56 may be controlled independently from amounts of power supplied to the first and second heating resistors 50,52.

The actuator for lateral positioning does not need to be electrically coupled with either the first or second heating resistor 50, 52 or the tip 32, it is just important that it is mechanically coupled to the tip 32 in a way that an extension of the actuator results in a lateral movement of the tip 32.

If the third heating resistor 56 is electrically coupled on one side to the same terminal as the second heating resistor 52 for reading is coupled to, then a simultaneous operation in respect of heating of the second and third resistors 52, 56 is possible in a simple way. This is desirable as during the read mode a precise positioning of the probe 8 helps to increase the rate of correctly detected marks 26 to 30 in case of the probe being mounted in the data storage device.

If, on the other hand the third heating resistor 56 is electrically connected to a further terminal 12, which is common also to the first heating resistor 50 for writing, this enables a simultaneous operation in a simple way of the first and third heating resistors 50, 56 during the write mode.

Figure 4:
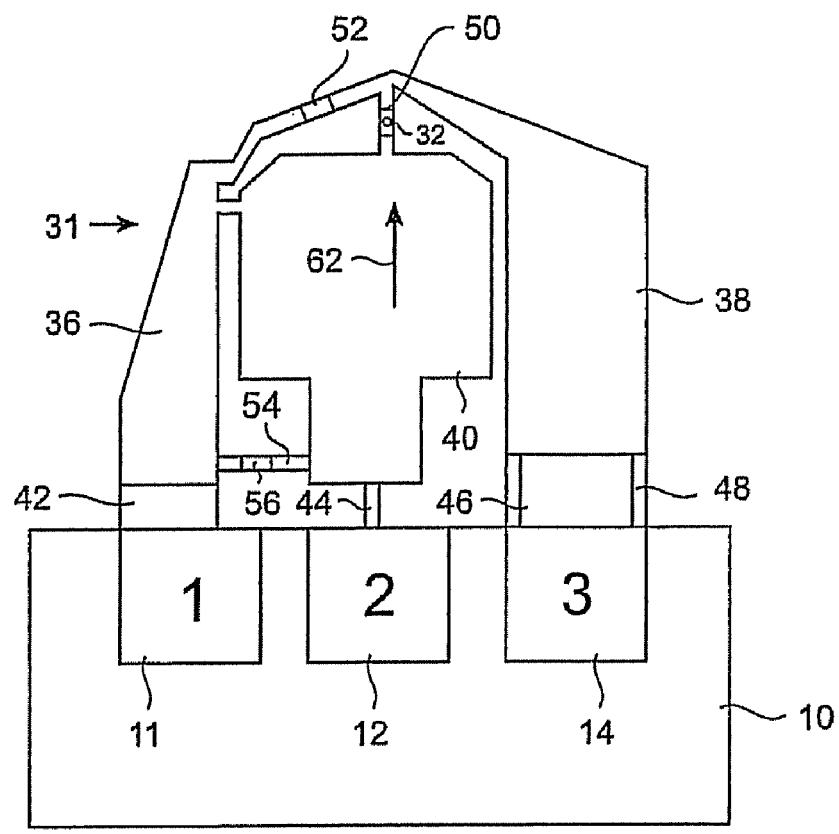

In the second embodiment according to FIG. 4 the capacitive platform 40 is formed such that an electrostatic force exerts a torque on the tip 32 around a tilting axis 62 of the spring cantilever. The capacitive platform 40 forms a first electrode of a capacitor which further comprises a second electrode, which is preferably located fixed relative to the substrate 2 and may be formed by the substrate 2 or part of the substrate 2. The capacitor further is formed by the medium between the first and second electrodes, which may be the medium 35 between the spring cantilever 31 and the substrate 2. Depending on a voltage potential difference present on these two electrodes an electrostatic force is exerted on the spring cantilever. In the embodiment according to FIG. 4 the capacitive platform is arranged asymmetrically to a beam comprising the tip 32. This results in a lateral tilting of the tip 32 with the degree of tilt being dependent on the electrostatic force acting on the capacitive platform 40. This tilting of the tip 32 also aids to laterally position the tip 32. For the purpose of the actuator for lateral positioning of the probe 8 a separate capacitive platform may also be provided which may preferably be electrically insulated from both the first and second heating resistors 50, 52 but needs to be mechanically coupled to the tip 32 in a way that further electrostatic force acting on that capacitive platform, which forms a second capacitor preferably together with the second electrode and the medium between the further capacitive platform and the second electrode, results in lateral positioning of the tip 32.

Figure 6:
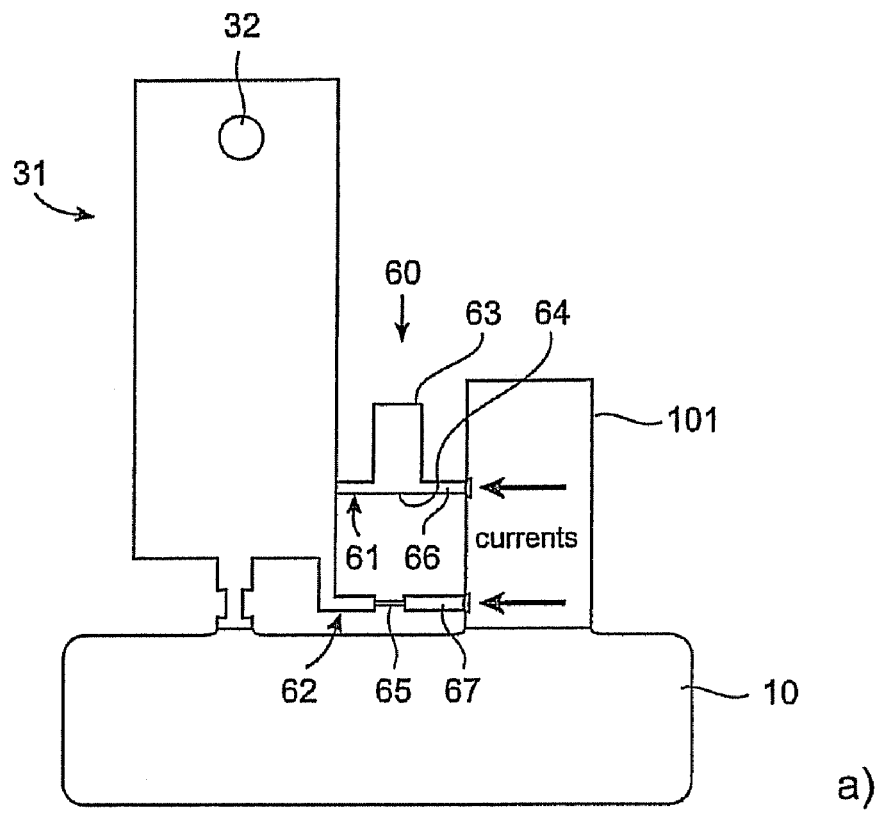
Figure 6:
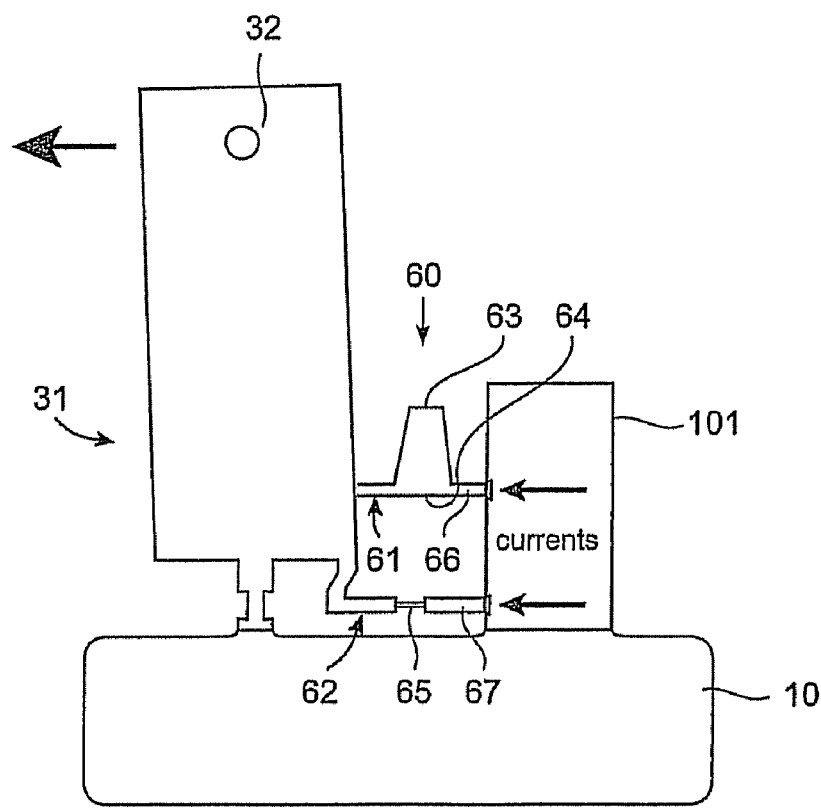

FIG. 6 illustrates a top view scheme of an embodiment of a probe configuration comprising a probe with a spring cantilever 31 and a tip 32. The probe is fixed to—and in this example formed from one piece of material with—the probe holding structure 10 which can e.g. be a substrate. The probe holding structure 10 comprises a nose 101. Between the probe and the nose 101, there is provided a bridge configuration 60. Such bridge configuration 60 represents an actuator for invoking lateral deflection of the probe if desired. Such bridge configuration can also be arranged between the two legs of a cantilever corresponding to the bridge as illustrated in the previous examples provided the cantilever design permits and provided that a lateral movement of the tip can be affected by such actuator.

In FIG. 6a) the probe configuration is illustrated in a relaxed state, i.e. the probe is not deflected by the actuator. The bridge configuration 60 comprises two bridges 61 and 62 arranged between the nose 101 and the probe. The first bridge 61 comprises a thermally switchable material 63 and a heating element 64 for providing heat to the thermally switching element 63 if needed. An electrical feed line is shown by reference 66 for providing the heating element 64 with current and thus driving the heating element 64.

The heating element 64 can be embodied as heating resistor or other heater embodiment. The thermally switchable element 63 can be made of metal or polymer. It is a preferred property of the thermally switchable element 63 to change its state upon impact of heat. Subject to the material used for the thermally switchable element 63, there is some temperature limit value above which the element 63 is soft and deformable, and in some cases even fluid, and below which temperature limit value the element 63 shows hard and rigid properties. According to the arrangement of the bridge 61 comprising the thermally switchable element 63, it can be derived that once the thermally switchable element 63 shows soft properties, the spring cantilever can move laterally while whenever the material of the thermally switchable element 63 is in a hard state, the spring cantilever 31 and consequently the tip 32 and the entire probe is fixed in its lateral position and cannot move laterally.

In order to bring the probe into a defined position before freezing it in such position, there is provided a second bridge 62 comprising a heating resistor 65. The heating resistor 65 can be embodied such as described with respect to the heating resistor 56 illustrated in connection with the probes of FIGS.

3 to 5, i.e. by choosing the geometry of the bridge 62 and setting the resistance of the heating resistor 65 suitably such that a thermal expansion characteristic of the bridge 62 may be obtained in a desired way depending on a voltage drop over the heating resistor 65. From the thermal expansion of the bridge 62 a lateral force results acting on the cantilever 31 which then results in laterally deflecting the tip 32.

Both bridges 61 and 62 of the bridge configuration 60 show different electrical feed lines 66 and 67 for providing heating currents to the heating element 64 respectively the heating resistor 65. Hence, the heating element 64 and the heating resistor 65 can be controlled independently from each other.

An appropriate way of setting the probe to a desired position starting from a relaxed position as shown in FIG. 6a) can start with heating the heating element 64 of bridge 61 by applying a current to electrical feed line 66. Now, the thermally switchable element 63 is heated above the temperature limit value and the thermally switchable element 63 takes a soft and flexible state, thereby enabling the probe to move laterally afterwards. Provided the heating resistor 65 in bridge 62 is not actuated and rests in the relaxed state as is in FIG. 6a) the probe is held in such relaxed position by bridge 62, although bridge 61 became flexible through heating the thermally switchable element 63 above the temperature limit value.

In a next step, the heating resistor 65 of bridge 62 is heated by providing a heating current to electrical feed line 67 and thus causing a thermally induced expansion of bridge 62. This expansion will result in a lateral movement of the probe as indicated by the black arrow in FIG. 6b) out of its centered position as depicted in FIG. 6a).

Once, the probe including the tip 32 reaches the desired position, it is desired to freeze such position. While maintaining the heating current for the heating resistor 65 on the level corresponding to such position of the probe, the heating current for heating the thermally switchable element 63 which heating current is kept above the temperature limit value in order to keep the thermally switchable element 63 flexible is now reduced, e.g. by switching off the current abruptly or ramping it down in a more moderate way in order to harden the thermally switchable element 63 once its temperature falls under the temperature limit value. Then, the bridge 61 becomes rigid and holds the probe in the desired position.

Now, the bridge 62 and its heating resistor 65 no longer need to be actuated as the holding function for the probe is now executed by the bridge 61. The heating current for the bridge 62 can be ramped down or even abruptly switched off, or can be kept. As the heating resistor 65 and the bridge 62 try to contract when being cooled down and the probe on the other hand is fixed in its position by bridge 61, there might occur mechanical stress in the bridge 62, and there might occur some small scale repositioning of the probe in lateral direction caused by the mechanical stress induced in bridge 62. FIG. 6b) shows such situation where the thermally switchable element 63 is frozen in an expanded state as indicated by the lateral expansion of the element 63 with respect to the relaxed state as shown in FIG. 6a). Bridge 62 is on its way to contract from an elongated state. Slightly twisted bridge 62 shall schematically indicate the mechanical stress induced in bridge 62 which in practice typically does not result in a twisting of the bridge 62.

Note that the point of force transmission does not necessarily need to be at the bottom edge of the cantilever 31 but can be at the same edge as the point of force transmission is arranged for the bridge 61. Due to the leverage effect it is preferred to transmit the force executed by the bridge 62 in the bottom region of the cantilever 32 as only small expansions of the bridge 62 results in a considerable deflection of the cantilever 31. However, according to another embodiment, the bridge 61 can be arranged above the bridge 62 to effect a point of force transmission closer to the top end of the cantilever 31—and to the tip 32. Such point of force transmission requires bigger expansions of the bridge 61 for inducing a deflection of the cantilever 31 compared to the point of force transmission at the bottom of the cantilever 31. However, with such arrangement the position of the tip 31 can be controlled more precise.

For repositioning the probe from such frozen deflected position it is preferred to heat the heating element 64 for making the thermally switchable element 63 become soft and flexible. The heating resistor 65 might or might not be actuated in such moment, such that the probe laterally moves back or forward to a position defined by the bridge 62. In such position, the bridge 61 can be frozen again provided such position represents the new desired position. Consequently, the bridge 62 can be heated causing mechanical stress before the bridge 61 is unfrozen i.e. is turned into its flexible state. Alternatively, the bridge 62 can be heated or cooled to the extension representing the new desired position of the cantilever after the bridge 61 was heated to become flexible again.

During operation of the probe the lateral positioning of the probe may be controlled by varying the currents supplied to the feed lines 66 and 67.

Figure 7:
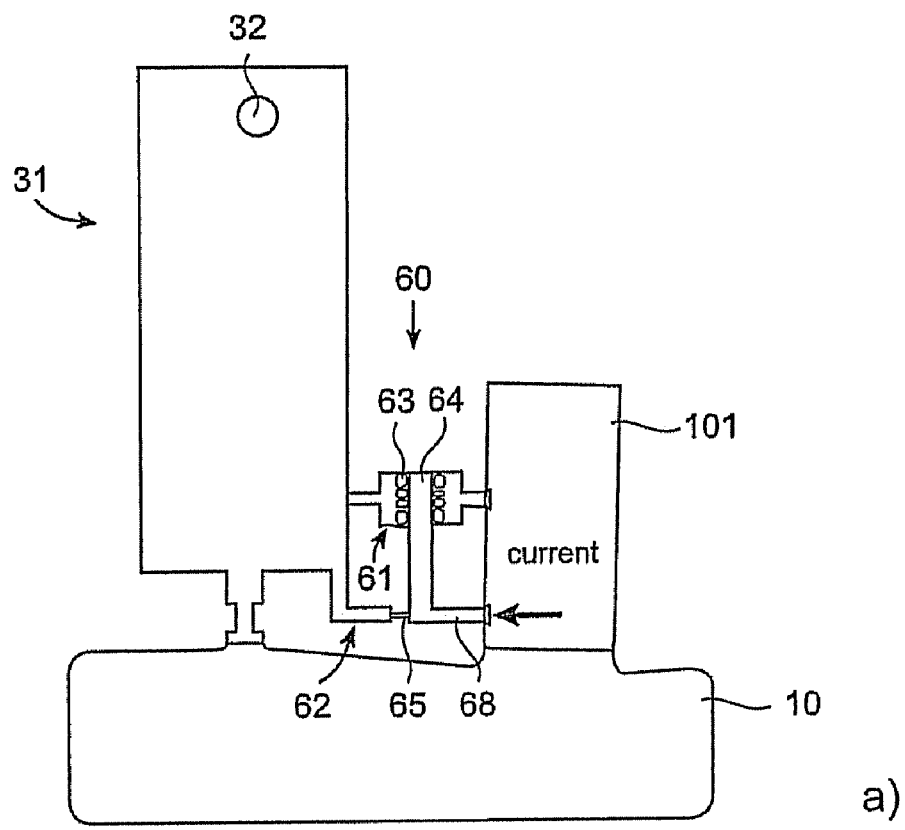
Figure 7:
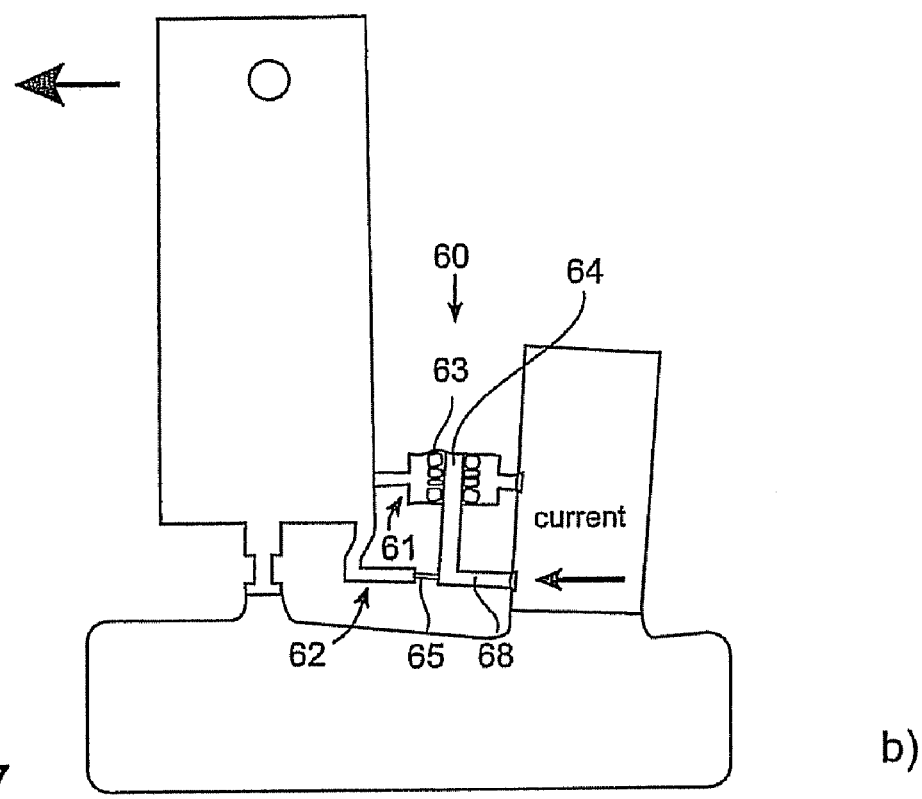

FIG. 7 illustrates a scheme of an alternative probe configuration. The same references are used as for the embodiment in FIG. 6 for referring to the same elements.

The embodiment of FIG. 7 differs to the one in FIG. 6 in that there is only one common electrical feed line 68 for both the heater resistor 65 and the heating element 64. The bridge 61 can be conductive but does not necessarily need to be conductive as no current is fed into the bridge 61.

Again, FIG. 7a) shows the ground state, i.e. the relaxed state without any actuation. Basically, actuation is the same as for the probe configuration of FIG. 6: An appropriate way of setting the probe to a desired position starting from a relaxed position as shown in FIG. 7a) can start with heating the heating element 64 of the bridge 61 by applying a current to the electrical feed line 68. Now, the thermally switchable element 63 is heated above the temperature limit value and the thermally switchable element 63 takes a soft and flexible state, thereby enabling the probe to move laterally.

However, now the heating resistor 65 is simultaneously heated. Unless the thermally switchable element 63 of the bridge 61 is softened, any heat induced extension in the bridge 62 causes mechanical stress in that bridge 62. Thus, it is desired to choose the materials of the heating resistor 65 and the thermally switchable element 63 such that the temperature limit value of the element 63 is close to a temperature in which the probe is operated and which defines the relaxed state. Then, the bridge 62 is only slightly elongated until the element 63 switches into its soft state, and consequently the mechanical stress in bridge 62 is reduced.

Once the softened state of element 63 is achieved and provided bridge 62 is not biased too much, the cantilever still rests in a position close to the relaxed position as shown in FIG. 7a). If heating is continued, the bridge 62 further expands while the thermally switchable element 63 remains soft and the bridge 61 follows the expansion of bridge 62. Once the desired position—i.e. is the desired deflection of the cantilever 32—is reached, this position now needs to be fixed by hardening bridge 61: Therefore, the current can be switched off abruptly. Preferably the heating resistor 65 and the heating element 64/thermally switching element 63 combination and/or the bridges 61 and 62 show different heat dissipation coefficients. Provided the heat from bridge 61 dissipates faster than from bridge 62, the position achieved with the previous steps can nearly be held as the bridge 61 will harden quickly while the bridge 62 contracts only slowly. There might be a slight deflection of the cantilever 31 back towards the relaxed position until bridge 61 freezes. Provided the heat dissipates faster from bridge 62 than from bridge 61, the cantilever might return a long way towards the relaxed position before bridge 61 freezes and fixes the cantilever's position.

According to another embodiment, the current can be ramped down slowly such that reduction of heat in the bridges 61, 62 is not primarily caused by the effect of heat dissipation but by controlled reduced current supply. Then, the cantilever 31 will be frozen at a position that is determined by the expansion of the bridge 62 at the temperature value limit for the thermally switchable element 63. Thus, the actuation gets reduced and gets frozen the moment the thermally switchable element 63 gets hard.

The position of freezing can be tuned by how fast the current supply and consequently the heat in heating element 64 and in heating resistor 65 is ramped down.

The data storage device preferably comprises fields in the storage medium to be scanned by associated probes. The probes may be arranged on the frame and result in a probe array. The fields can be data fields comprising data. The data storage device may also comprise a number of global operational fields containing global operational information. A respective probe 8 is allocated to each of these global operational fields. The global operational information may be servo information for globally keeping the probes in respective tracks. It may however, also contain timing information for scanning the probe within one track. This may also be referred to as global clock information. The global servo positioning may be achieved by evaluating the servo information obtained from the global operational fields—which servo information preferably provides information of lateral deflection of the probe/probes from a track centerline on the storage medium—and respectively controlling the scanner 22 as global actuator. In that way distortions affecting all or some of the spring cantilevers 31 mounted on the frame 10 may be compensated for.

Distortions affecting individual probes 8 or a subset of the probes 8 mounted on the frame 10 may be compensated for by respective actuation of the actuator for lateral positioning. As these distortions have been shown to occur on a time scale much larger than the one relevant for some of the globally-affecting distortions, it is sufficient to provide respective servo information at designated locations within respective fields assigned to the individual probes, which otherwise contain data. In this respect it is preferred to have this servo information, for example, only at a beginning and/or end of each track or only at the beginning and/or end of every second or third or more tracks. In this way the servo information overhead can be kept low which results in a higher data density.

This individual servo information is then used to control the respective actuator for lateral positioning of that individual probe. For that purpose the voltage potential difference between the voltage potentials present on the first and second terminals 11,12 in the case of the first and second embodiment of the probe 8 or on the fourth and first terminals 58, 11 in the case of the third embodiment of the probe 8 or the current/s in the embodiments of FIG. 6 and FIG. 7 may be respectively adjusted. It is advantageous that an increase or decrease of the voltage potential supplied to the first terminal 11 during the read mode has only a negligible effect on a possible erasure of marks in the surface substrate 6, as the tip 32, which is closest to the indentations, is located far away from the second heating resistor 52 for heating and is therefore not significantly heated up during the read mode.

The actuator for lateral positioning may for example also comprise a piezoelectric element or any other component being suitable for the purpose of lateral positioning of the tip 32.

The invention claimed is:

1. A method of scanning over a substrate, the method comprising:

implementing a write mode of the substrate by scanning a probe across a substrate, the probe having a spring cantilever with first, second and third legs mechanically fixed to a probe holding structure, a tip with a nanoscale apex extending from the second leg, a first heating element in contact with the tip, and an actuator for lateral positioning of the tip;

the actuator comprising a thermally switchable element and a second heating element for heating the thermally switchable element; and heating the first heating element to a given temperature so as to locally soften a portion of the substrate and applying a force to the softened portion of the substrate through the tip so as to create one or more indentation marks in the softened portion of the substrate.

2. The method of claim 1, wherein the first and second heating elements comprise heating resistors.

3. The method of claim 1, wherein the actuator for lateral positioning is formed as a bridge between the first and second legs of the spring cantilever.

4. The method of claim 3, wherein the cantilever spring comprises hinges respectively coupling first, second and third terminals with the first, second and third legs, with the first, second and third terminals serving as electrical contacts, and wherein the bridge is located in proximity to the hinges.

5. The method of claim 4, wherein the bridge is located such that a third heating element for reading and the second heating element of the actuator for lateral positioning are electrically connected to the first terminal.

6. The method of claim 3, wherein the bridge is located such that the first heating element for writing and the second heating element of the actuator for lateral positioning are electrically connected to the second terminal.

7. The method of claim 1, wherein the actuator for lateral positioning is coupled to a fourth leg of the spring cantilever, the fourth legs also mechanically fixed to the probe holding structure.

8. The method of claim 1, wherein the actuator for lateral positioning comprises a capacitive platform arranged and formed such that an electrostatic force exerts a torque on the tip around a tilting axis of the spring cantilever.

9. The method of claim 1, further comprising implementing a read mode of the substrate by heating a third heating element to another given temperature and sensing a change in heat dissipation between the third heating resistor and the substrate whenever the tip moves into one of the one or more indentation marks.

10. The method of claim 1, wherein the substrate comprises a data storage device, and the one or more indentation marks represents data of a first logical value with respect to locations of the substrate without indentation marks, which represent data of a second logical value.

11. A method of scanning over a substrate, the method comprising:

laterally positioning a probe across a substrate from a first position to a second position, the probe having a spring cantilever mechanically fixed to a probe holding structure, a tip with a nanoscale apex extending from the cantilever, an actuator for lateral positioning of the tip, and a bridge configuration disposed between the cantilever and a nose of the probe holding structure;

wherein the actuator comprises a first bridge of the bridge configuration, and includes a thermally switchable element and a first heating element for heating the thermally switchable element.

12. The method of claim 11, further comprising:

heating the first heating element so as to render the thermally switchable element and first bridge in a flexible state;

heating a second heating element of a second bridge of the bridge configuration so as to thermally expand the second bridge and laterally move the probe to the second position;

deactivating the first heating element while maintaining heating of the second heating element so as to harden the thermally switchable element of the first bridge and maintain the probe in the second position; and deactivating heating the second heating element.

13. The method of claim 12, wherein the actuator comprises a common electrical feed line for controlling the first heating element and the second heating element.

14. The method of claim 12, wherein the actuator comprises different electrical feed lines for controlling the first heating element and the second heating element.

* * * * *